UNITED STATES PATENT OFFICE.

JEAN M. O. TAMIN, OF NEW YORK, N. Y.

IMPROVEMENT IN MEDICAL COMPOUNDS AND MEDICATED FOOD.

Specification forming part of Letters Patent No. 136,678, dated March 11, 1873.

*To all whom it may concern:*

Be it known that I, Dr. JEAN MARIE ONESIME TAMIN, of the city, county, and State of New York, have invented a new and Improved Alimentary and Medical Preparation called "Phosphorine," of which the following is a specification:

The object of this invention is to prepare a class of food or medicament which will be particularly nourishing to the human brain and nervous system, and thereby beneficial to persons occupied with severe mental labor, or to invalids. The invention consists in extracting from vegetable substances those most nourishing ingredients which are combined with phosphorus, and in subsequently adding them to the substances to be eaten or imbibed as articles of food or medicines. Thus, for example, I propose to withdraw from vegetables, such as pease or beans, the ingredients above referred to, discarding the indigestible, or at least with difficulty digestible, residue of such vegetables, and to add the matter extracted to chocolate or other suitable article of food. I thereby add very nourishing and easily-digested substance to the food taken, whereby its brain-restoring property is materially increased, without a corresponding increase of bulk.

A large number of animal or vegetable substances contain more or less phosphorus. The ingredients with which this element is combined, and with which the same can be readily extracted from the animal or vegetable substances containing them, are known as animal or vegetable albumen. Such substances are, for example, the eggs of birds, fishes, reptiles, turtles, the marrow and brain of animals, sponges, &c. To these natural producers of phosphorus may be added the organic or artificially vegetable phosphori, such as ethylic, acethylic, chloracethylic, &c., phosphorus, morphine, quinine, atropine, &c.

Among other modes of extraction which are applicable to vegetable substances I will indicate the following: I take a certain quantity, say, of pease, powder it carefully, and then treat it with water at an ordinary temperature, taking about two parts of water to one of the powder. I then decant or filter the mixture, and evaporate so much of the moisture as to leave the remainder of a more or less viscid consistency. I then add gastric juice or finely-cut pieces of a calf's stomach, about one part to one hundred parts of the compound. The effect will be similar to that of the gastric juice on caseine. Finally, I dry the mixture at a moderate heat, or by exposing it to the air, and may, if desired, flavor it before drying, or afterward, as may be most convenient.

I may, in place of the above, base my proceeding on animal or vegetable substances upon the solubility and insolubility of certain constituents in water, alcohol, ether, or other substance, or by the use of other chemical properties or appliances.

Artificial substances are prepared by letting phosphoric vapors slowly enter an alcoholic or ethereous solution, or any other solution containing the vegetable extract, such as extract of belladonna, of opium, or other, upon which it is intended to have the mineral phosphorus act. Afterward the process will be substantially the same as already described with reference to vegetable phosphoric extracts.

The quantity of phosphoric vapors applied to the extracts is preferably determined by their absorption into the extracts—*i. e.,* the supply is stopped when no more vapors are absorbed.

The substances with which the phosphorus is thus mixed I propose to call "phosphorine," preferably with the appendix thereto of the name of the substance containing it, such as "chocolate phosphorine," &c.

The phosphorus can, for the purposes stated, be applied to all medical or alimentary preparations, such as pills, extracts, pastilles, sirups, pastries, bread, chocolate, biscuit, cake, &c.

Having thus described my invention, I claim as new and desire to secure by Letters Patent—

1. A medical compound formed of phosphorus united with gastric juice or comminuted portions of calf-stomach, dried and applicable in the manner and for the purpose described.

2. A liquid compound formed of phosphorus applied in a vaporous form to solutions of vegetable extracts, as and for the purpose described.

DR. J. M. O. TAMIN.

Witnesses:
A. V. BRIESEN,
T. B. MOSHER.